(12) United States Patent
Bock

(10) Patent No.: US 7,530,529 B2
(45) Date of Patent: May 12, 2009

(54) SEPARATION WALL IN AN AIRCRAFT CABIN

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 175 days.

(21) Appl. No.: 11/484,567

(22) Filed: Jul. 12, 2006

(65) Prior Publication Data

US 2007/0018044 A1    Jan. 25, 2007

Related U.S. Application Data

(60) Provisional application No. 60/708,796, filed on Aug. 17, 2005.

(30) Foreign Application Priority Data

Jul. 12, 2005    (FR) .................................. 05 07442

(51) Int. Cl.
*B64D 11/00* (2006.01)

(52) U.S. Cl. .............. 244/118.5; 244/118.6; 244/129.4; 244/129.5

(58) Field of Classification Search .............. 244/118.1, 244/118.2, 118.5, 118.6, 129.4, 129.5; 49/380, 49/463; 52/64–71, 29

See application file for complete search history.

(56) References Cited

U.S. PATENT DOCUMENTS

| 4,597,549 | A | * | 7/1986 | Ryan ........................ 244/118.5 |
|---|---|---|---|---|
| 4,911,219 | A | * | 3/1990 | Dalrymple .................. 160/118 |
| 5,165,626 | A | * | 11/1992 | Ringger et al. ............ 244/118.5 |
| 5,393,013 | A | * | 2/1995 | Schneider et al. ......... 244/118.5 |
| 5,577,358 | A | * | 11/1996 | Franke ....................... 52/238.1 |
| 5,716,026 | A | * | 2/1998 | Pascasio et al. ........... 244/118.6 |
| 6,523,779 | B1 | * | 2/2003 | Michel ..................... 244/118.5 |
| 6,588,705 | B1 | * | 7/2003 | Frank ....................... 244/118.5 |
| 6,691,952 | B2 | * | 2/2004 | Keogh ...................... 244/118.5 |
| 6,817,577 | B2 | * | 11/2004 | Semprini ................... 244/118.5 |
| 6,874,730 | B2 | * | 4/2005 | Harasta .................... 244/118.5 |
| 7,252,267 | B2 | * | 8/2007 | Young et al. ............. 244/118.5 |
| 7,293,739 | B2 | * | 11/2007 | Young et al. ............. 244/118.5 |

* cited by examiner

*Primary Examiner*—Michael Carone
*Assistant Examiner*—Philip J Bonzell
(74) *Attorney, Agent, or Firm*—Oblon, Spivak, McClelland, Maier & Neustadt, P.C.

(57) ABSTRACT

This separation wall (2) for an aircraft cabin comprises:
 a rigid and fixed vertical panel (24, 26, 28),
 a section (32) movable between an opened out position in which the movable section (32) projects beyond the contours of the rigid and fixed panel (24, 26, 28) and a retracted position in which the projecting portion of the movable section (32) is retracted at least partially in relation to the contours of the rigid and fixed panel (24, 26, 28).

10 Claims, 2 Drawing Sheets

SEPARATION WALL IN AN AIRCRAFT CABIN

Figure 1:
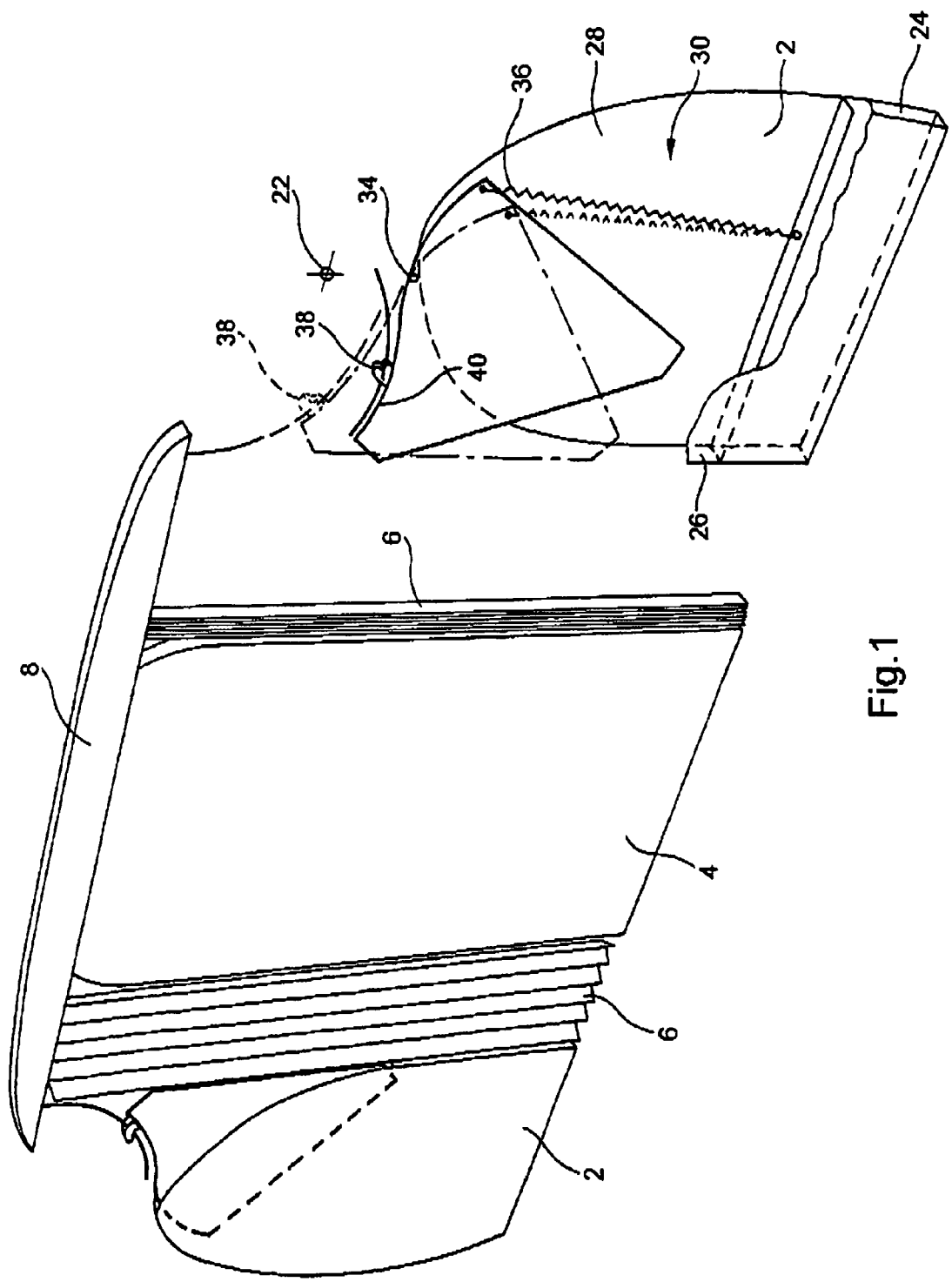

This invention relates to a separation wall in an aircraft cabin.

In an aircraft cabin, there often are seats of different types. These different seats make it possible to offer passengers various levels of comfort in the aircraft cabin. In such cabins, there then generally are three levels of comfort defining three classes of increasing comfort: economy class, business class and first class. Seats of the same class generally are grouped within one compartment.

In known manner, the compartments in an aircraft cabin are separated from one another by a transverse separation partition. These partitions are to be implemented in compliance with the different safety rules. Accordingly, it is advisable, in particular, to be able to evacuate the aircraft rapidly in the event of danger. The aisles of the aircraft cabin therefore are not to comprise any obstacles. The separation partitions of the prior art thus generally consist of rigid walls having the width of two or three seats and arranged behind a transverse row of seats. Between these walls, in the aisle (or aisles), a curtain, generally textile, achieves the separation between the compartments.

With such a separation partition, the isolation between the compartments is incomplete. This is due in part to the use of soft curtains to achieve the separation in the aisles, but also to the shape of the rigid walls. In fact, in order to permit the opening of the baggage bins, positioned overhead, the upper portion of the rigid walls is cut out. Thus during a flight, when the baggage bins are closed, a cut-out appears in the separation wall at each baggage bin.

The purpose of this invention then is to provide a separation wall (and partition) making it possible to achieve good isolation between aircraft cabin compartments, even at the baggage bins.

To this end, it proposes a separation wall for an aircraft cabin comprising a rigid and fixed vertical panel.

According to the invention, this wall further comprises a section movable between an opened out position in which the movable section projects beyond the contours of the rigid and fixed panel, and a retracted position in which the projecting portion of the movable section is retracted at least partially in relation to the contours of the rigid and fixed panel.

Such a separation wall may be adapted to "variable" contours such as those defined by a baggage bin that may be open or closed. Thus, the opened out position of the movable section corresponds, for example, to the closed position of a baggage bin beneath which the separation wall is situated, and the retracted position corresponds to the open position of this baggage bin.

In a first embodiment, the movable section is mounted pivoting around a horizontal axis. It is a matter here of a simple movement that generally makes it possible to follow closely the movement of opening of a baggage bin.

A preferred embodiment provides that the movable section is a leaf that, in its retracted position, is housed at least partially in an accommodation provided for this purpose in the rigid and fixed panel. Thus, esthetically, only the projecting portion of the movable section is visible. In this preferred form, the rigid and fixed panel comprises, for example, two lateral surfaces between which the movable leaf becomes positioned, and guidance of the movable leaf between its opened out position and its retracted position, and vice versa, is provided by the lateral surfaces of the rigid and fixed panel. In this variation, the movable leaf is guided like a glass door pane of a motor vehicle.

In order to control the movement of the movable section, it is proposed, for example, that return means pre-stress the movable section toward its opened out position. In this manner, this section can follow the "variable" contour. In the case of a wall situated beneath a baggage bin, the movable section can follow the openings and closings of this bin.

For a better connection between a movable section and a baggage bin, the movable section has an upper edge on which there slides, for example, a stop intended to make contact with a baggage-bin door, and set thereon.

This invention also relates to a separation partition for an aircraft cabin comprising at least one separation wall and one curtain, in which at least one separation wall is a wall such as described above. It further relates to an aircraft cabin and an aircraft, characterized in that they each comprise at least one such separation wall.

Figure 2:
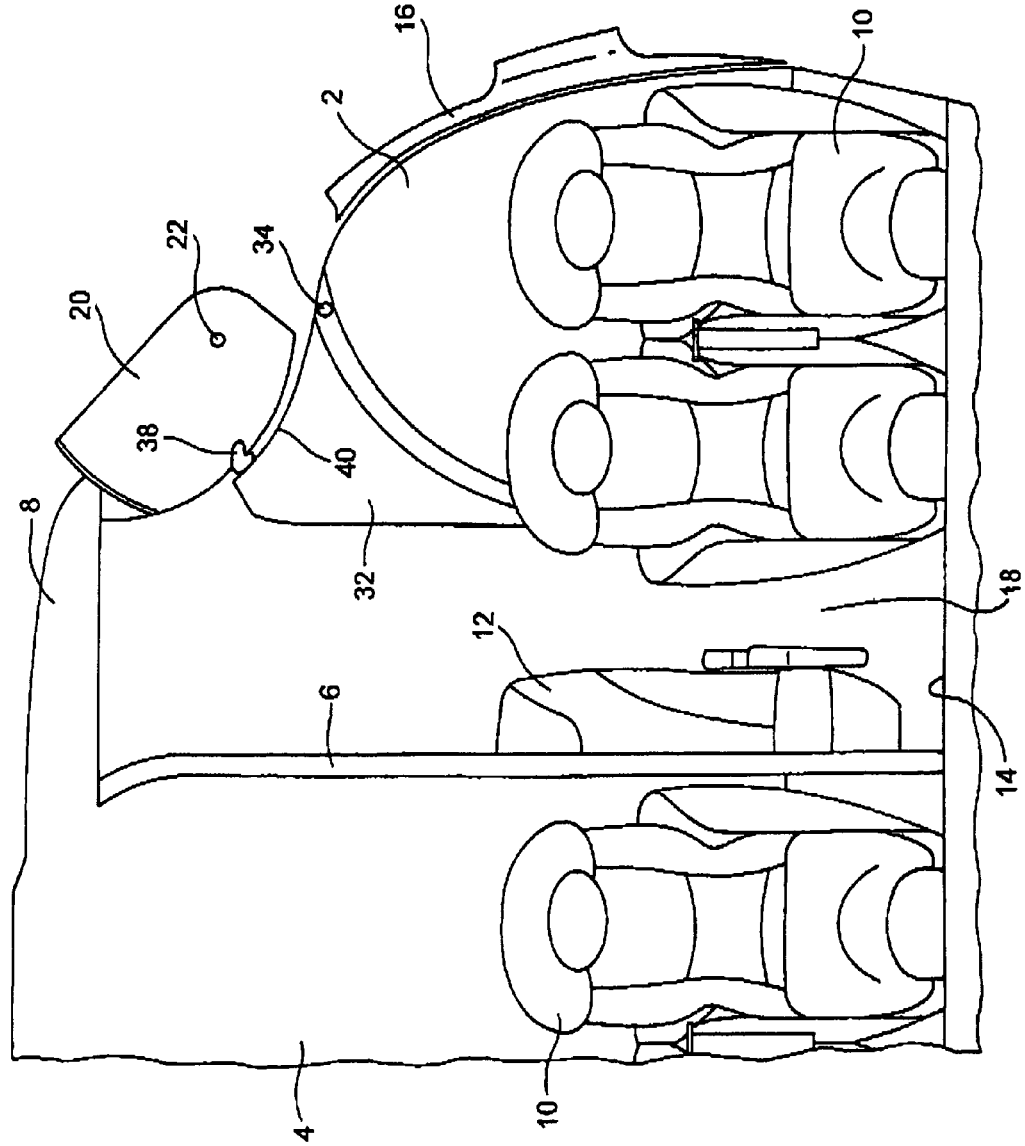

Details and advantages of this invention will emerge more clearly from the description that follows, presented with reference to the attached schematic drawings on which:

FIG. 1 represents in perspective a separation partition according to the invention, and FIG. 2 is a partial front view of an aircraft cabin equipped with a separation partition according to the invention.

FIG. 1 represents a separation partition intended to be positioned in an aircraft cabin. This partition is intended to be arranged transversely in this cabin. This separation partition comprises in particular two lateral separation walls 2, a central separation wall 4, two curtains 6 and an upper band 8. All these components are placed more or less in the same plane, which in the remainder of the description will be assumed to be vertical.

As FIG. 2 shows, this separation partition is intended to isolate two compartments of the aircraft cabin from one another. In the example of FIG. 2, the separation partition is arranged between a business class compartment equipped with convertible seats 10 and an economy class compartment equipped with reclining-back seats 12. The separation partition extends from the floor 14 of the aircraft cabin up to the ceiling thereof and from one lateral wall 16 of this cabin to the opposite lateral wall.

The central separation wall 4 is a fixed rigid wall. It corresponds to a separation wall such as those known from the prior art. It is arranged between two successive rows of seats. In the aircraft cabin considered here by way of example, two aisles 18 (only one of which is represented on FIG. 2) extend longitudinally in the aircraft cabin in order to permit access to the seats of this cabin. The central separation wall 4 is delimited by these two aisles 18. The isolation between the two compartments of the aircraft cabin separated by the separation partition represented is accomplished in the aisles by the curtains 6. Thus such a curtain 6 is found on both sides of the central separation wall 4. On FIG. 1, a first curtain 6 is shown in its drawn position in which it forms a separation between the two compartments and another curtain is shown in its folded back position in which the curtain 6 leaves the passage between the two compartments clear.

The band 8 is arranged above the central separation wall 4 and the curtains 6. The latter, for example, can be held up by the band 8. A slide thus may be provided at the ends of this band 8 on the lower surface of the latter.

This band is, for example, an illuminated band on which pictograms (not represented) may appear. These pictograms, for example, may indicate to the passengers the free or occupied status of a lavatory, possibly serve as a no-smoking reminder, ask the passengers to fasten their seat belt, etc. . . .

This invention relates more particularly to the lateral separation walls for the cabin configuration represented in the drawings. These lateral separation walls 2 are arranged against the lateral walls 16 of the aircraft cabin. On the side opposite this lateral cabin wall 16, they are delimited by an aisle 18. The lateral separation walls 2 represented rest on the floor 14 of the aircraft cabin. In the upper portion, these lateral separation walls 2 extend not up to the ceiling of the aircraft cabin, but up to a baggage bin 20. In the example represented, the latter is mounted pivoting around a longitudinal horizontal axis. On the Figures, this axis is symbolized by a first pivoting point 22. This point corresponds to the intersection between the horizontal pivoting axis and the vertical plane accommodating the separation partition.

The two lateral separation walls 2 of FIG. 1 are symmetrical in relation to a vertical median plane of the aircraft cabin. Accordingly, only one of these lateral separation walls 2 will be described below.

A lateral separation wall 2, in its preferred embodiment, comprises a base 24, a front surface 26 and a rear surface 28. The base 24 rests on the floor 14 of the aircraft cabin. The front 26 and rear 28 surfaces are symmetrical in relation to one another and define between them a housing 30. The latter accommodates a movable leaf 32 (while the base 24 and the front 26 and rear 28 surfaces are considered as being fixed).

The shape of the front 26 and rear 28 surfaces is such that when the baggage bin 20 is in open position, a space remains between the upper portion of the front 26 and rear 28 surfaces and the baggage bin 20 in its open position. The movable leaf 32 comes to fill the opening remaining between the front 26 and rear 28 surfaces of the lateral separation wall 2 and the baggage bin 20, whether the latter is in closed or open position.

In the preferred embodiment represented in the drawings, the movable leaf 32 is mounted pivoting around a second horizontal axis, parallel to the pivoting axis of the baggage bin 20. A second pivoting point 34 which corresponds to the intersection of the pivoting axis of the movable leaf 32 with the plane containing the separation partition has been represented on FIGS. 1 and 2. In its pivoting movement, the movable leaf 32 is guided by the front 26 and rear 28 surfaces.

Means are provided for pre-stressing the movable leaf 32 in its raised position, in contact with the baggage bin 20. In the embodiment represented, these means comprise a spring 36 attached on the one hand to the movable leaf 32 and on the other hand to a fixed point, for example the base 24 of the lateral separation wall 2, as represented on FIG. 1.

In the preferred embodiment represented in the drawing, the movable leaf 32 does not make contact directly with the baggage bin 20. A stop 38 set underneath the baggage bin provides the connection between the latter and the movable leaf 32. It is observed on the drawings that the movable leaf has an upper edge 40 picking up the contour of the lower surface of the baggage bin 20. When the baggage bin 20 is opened, the stop 38 comes to slide on the upper edge 40 of the movable leaf 32.

On FIG. 2, the movable leaf 32 is represented in its opened out position corresponding to the closed position of the baggage bin. This opened out position is represented with a dotted line on FIG. 1. On this latter Figure, the movable leaf 32 is represented in its position retracted inside the housing 30 with an unbroken line. It is observed that the movable leaf 32 is only partially retracted into its housing 30. In another embodiment, it could be provided that the front 26 and rear 28 surfaces of the lateral separation wall 2 more or less come to assume the shape of the lower surface of the baggage bin 20 when the latter is in open position. In such a scenario, the movable leaf, in its retracted position, would be housed entirely in its housing 30.

As can be seen on the drawings, the movable leaf 32 makes it possible to put the finishing touches on the isolation between two compartments of an aircraft cabin. A separation partition such as described above makes it possible to achieve a good isolation between two compartments. It makes it possible, in particular, to have a visual and phonetic isolation of the compartments. Different lighting also may be provided in two adjoining compartments separated by the separation partition according to the invention.

The separation partition according to the invention makes it possible to achieve this isolation just as well when the baggage bins are in their open position as when they are in closed position.

In addition, the separation partition according to the invention makes it possible to comply with the safety rules and in particular does not hamper the evacuation of the passengers in the event of emergency.

This invention is not limited to the preferred embodiment described above by way of non-limitative example. It also relates to all the variations of implementation within the capacity of the individual skilled in the art within the context of the claims below.

A separation partition according to the invention may be adapted to all types of aircraft. It relates just as well to single-aisle aircraft as to aircraft comprising several aisles. The description presented relates to the isolation of two compartments of different comfort classes. Such a separation partition, of course, may be used to produce two compartments of one and the same comfort class or, for example, to isolate a compartment intended to accommodate passengers and another compartment intended, for example, for the flight personnel (galley, etc. . . . ) or any other type of space (medical space for repatriation on medical grounds, etc. . . . ).

The above description sets forth a preferred embodiment in which the leaf is mounted pivoting. In this example of implementation, the movement of the movable leaf is adapted to the movement that most often is found in a baggage bin. It is clear that the movement of the movable leaf may be different from the one described. For example, a translation of this leaf may be provided in particular in the case where the baggage bin is opened by being translated. Likewise, the movable leaf described is guided between the front surfaces and the rear surfaces of a lateral separation wall. There could be provided a structure in which the movable leaf would not come to be housed between two surfaces of a wall but simply would come to slide or pivot (or any other movement) along a wall.

The invention claimed is:

1. A separation wall in an aircraft cabin comprising:
  a rigid and fixed vertical panel, and
  a movable section that is movable between an opened out position in which the movable section projects beyond the contours of the rigid and fixed panel and a retracted position in which the projecting portion of the movable section is retracted at least partially in relation to the contours of the rigid and fixed panel, and
  a stop connected to a door of a baggage bin and to an upper edge of the movable section such that said stop slides along said upper edge of the movable section and moves said movable section from the opened out position to the retracted position in response to the door of the baggage bin moving from a closed position to an open position.

2. A separation wall according to claim 1, wherein the movable section is mounted pivoting around a horizontal axis.

3. A separation wall according to one of claim 1, wherein the movable section is a leaf that, in its retracted position, is housed at least partially in an accommodation provided in the rigid and fixed panel.

4. A separation wall according to claim 3, wherein the rigid and fixed panel comprises two lateral surfaces between which the movable leaf becomes positioned, and wherein the guiding of the movable leaf between its opened out position and its retracted position, and vice versa, is provided by the lateral surfaces of the rigid and fixed panel.

5. A separation wall according to one of claim 1, further comprising a pre-stressed return means for returning the movable section to its opened out position.

6. A unit comprising a baggage bin with a baggage-bin door and the separation wall according to claim 1, wherein said stop is connected to the baggage-bin door.

7. A separation partition in an aircraft cabin comprising the separation wall of claim 1 and a curtain.

8. An aircraft cabin comprising at least one separation wall according to claim 1.

9. An aircraft comprising at least one separation wall according to claim 1.

10. An aircraft comprising at least one unit according to claim 6.

* * * * *